United States Patent
Russman et al.

(10) Patent No.: US 10,821,862 B2
(45) Date of Patent: Nov. 3, 2020

(54) TEMPERATURE CONTROL SYSTEM FOR SEATING ASSEMBLY

(71) Applicant: Ford Global Technologies, LLC, Dearborn, MI (US)

(72) Inventors: Daniel Russman, Ann Arbor, MI (US); Daniel Boccuccia, San Francisco, CA (US); Chih-Wei Tang, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 16/212,195

(22) Filed: Dec. 6, 2018

(65) Prior Publication Data
US 2020/0180479 A1 Jun. 11, 2020

(51) Int. Cl.
*A47C 7/74* (2006.01)
*B60N 2/56* (2006.01)
*B60N 2/58* (2006.01)

(52) U.S. Cl.
CPC ........... *B60N 2/5642* (2013.01); *B60N 2/565* (2013.01); *B60N 2/5657* (2013.01); *B60N 2/58* (2013.01)

(58) Field of Classification Search
CPC .. B60N 2/5635; B60N 2/5657; B60N 2/5685; B60N 2/565; B60N 2/5628; B60N 2/5642; A47C 7/74
See application file for complete search history.

(56) References Cited

U.S. PATENT DOCUMENTS

| | | | | |
|---|---|---|---|---|
| 5,902,014 A * | 5/1999 | Dinkel | ................. | B60N 2/5635 297/180.1 |
| 6,019,420 A * | 2/2000 | Faust | ................... | B60N 2/5635 297/180.12 |
| 6,189,966 B1 * | 2/2001 | Faust | ................... | B60N 2/5635 297/180.13 |
| 6,196,627 B1 * | 3/2001 | Faust | ................... | B60N 2/5635 297/180.1 |
| 6,541,737 B1 * | 4/2003 | Eksin | ................. | B60H 1/00792 219/217 |
| 6,629,725 B1 * | 10/2003 | Kunkel | ................ | B60N 2/5635 297/180.12 |
| 7,877,827 B2 * | 2/2011 | Marquette | ............ | A47C 21/044 5/423 |
| 9,022,464 B2 | 5/2015 | Feng et al. | | |
| 9,237,606 B2 * | 1/2016 | Yue | .......................... | H05B 3/34 |
| 2002/0067058 A1 * | 6/2002 | Pfahler | .................. | A47C 7/744 297/180.11 |
| 2005/0093346 A1 * | 5/2005 | Witchie | ............... | B60N 2/5628 297/180.1 |

(Continued)

FOREIGN PATENT DOCUMENTS

DE 102007001132 A1 7/2008
DE 102012000445 A1 9/2012
(Continued)

*Primary Examiner* — Shin H Kim
(74) *Attorney, Agent, or Firm* — David Coppiellie; Price Heneveld LLP

(57) ABSTRACT

A vehicle seating assembly includes a cushion and a trim layer. A permeable heater is disposed between the cushion and the trim layer. An air mover is in fluid communication with the permeable heater. The permeable heater and the air mover are operable to respectively heat or cool a seating surface.

20 Claims, 16 Drawing Sheets

(56) References Cited

U.S. PATENT DOCUMENTS

| | | | |
|---|---|---|---|
| 2005/0121965 A1* | 6/2005 | Stowe | B60N 2/5635 297/452.42 |
| 2005/0173950 A1* | 8/2005 | Bajic | A47C 7/72 297/180.14 |
| 2006/0103184 A1* | 5/2006 | Stoewe | B60N 2/5635 297/180.14 |
| 2006/0138810 A1* | 6/2006 | Knoll | A47C 7/74 297/180.1 |
| 2007/0035162 A1* | 2/2007 | Bier | B60H 1/00285 297/180.15 |
| 2008/0083740 A1* | 4/2008 | Kaiserman | A43B 7/04 219/520 |
| 2009/0031742 A1* | 2/2009 | Seo | B60N 2/5628 62/244 |
| 2009/0152909 A1* | 6/2009 | Andersson | B60N 2/5642 297/180.13 |
| 2009/0302646 A1* | 12/2009 | Baur | B60N 2/5635 297/180.1 |
| 2010/0048752 A1* | 2/2010 | Vignola | C08J 3/246 521/139 |
| 2010/0126985 A1 | 5/2010 | Feng et al. | |
| 2011/0109128 A1* | 5/2011 | Axakov | A47C 7/744 297/180.1 |
| 2012/0125914 A1* | 5/2012 | Yue | H05B 3/34 219/548 |
| 2015/0239379 A1* | 8/2015 | Yoshida | B60N 2/5816 297/180.12 |
| 2015/0313475 A1* | 11/2015 | Benson | A61B 5/6893 297/217.3 |
| 2015/0329027 A1* | 11/2015 | Axakov | B60N 2/565 297/180.13 |
| 2016/0001632 A1 | 1/2016 | Song et a. | |
| 2016/0167482 A1 | 6/2016 | Oh et al. | |
| 2016/0347263 A1 | 12/2016 | Kwon et al. | |
| 2016/0374147 A1 | 12/2016 | Song et al. | |
| 2017/0354190 A1 | 12/2017 | Cauchy | |
| 2018/0022252 A1* | 1/2018 | Arata | B60N 2/56 297/452.42 |

FOREIGN PATENT DOCUMENTS

| | | |
|---|---|---|
| JP | 2009051725 A | 3/2009 |
| KR | 20150071229 A | 6/2015 |

* cited by examiner

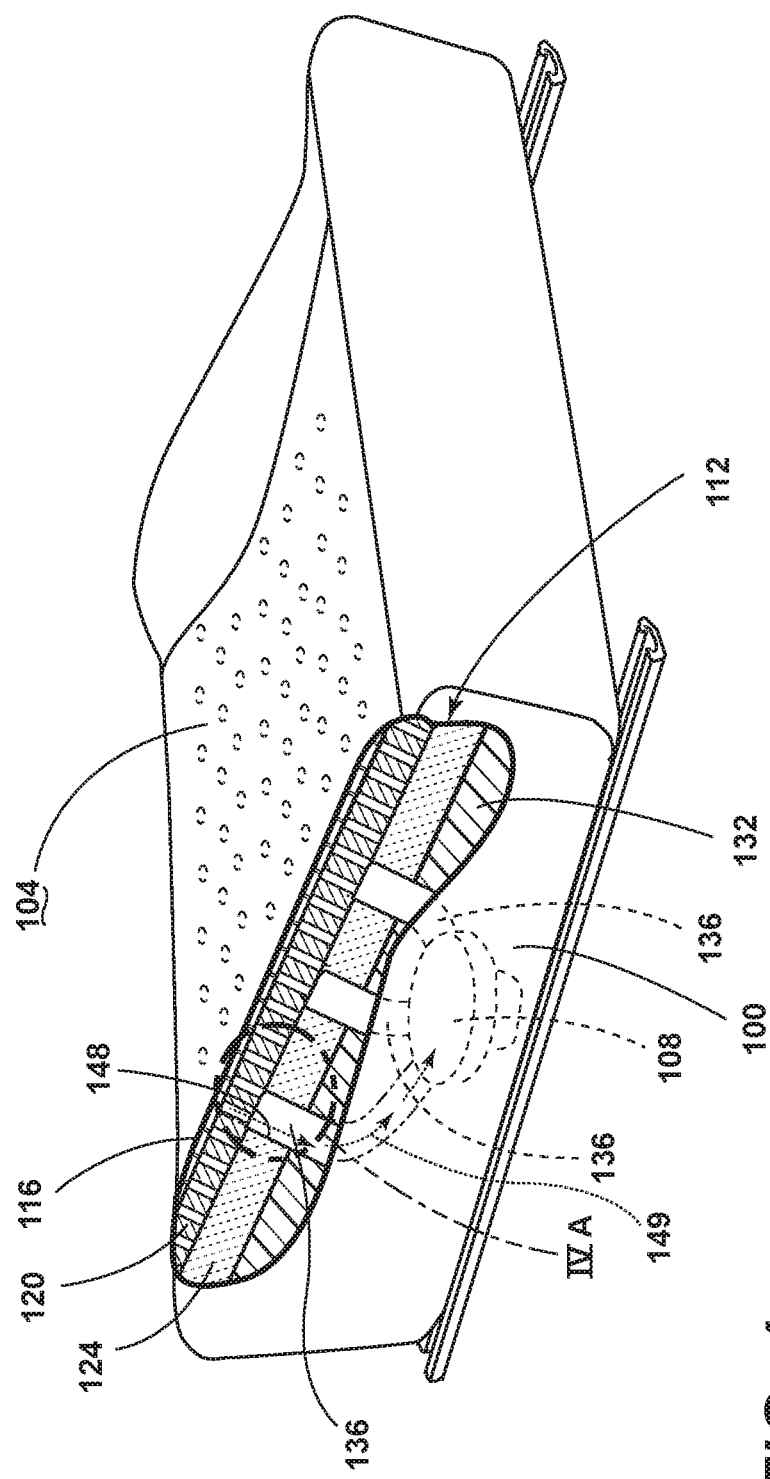

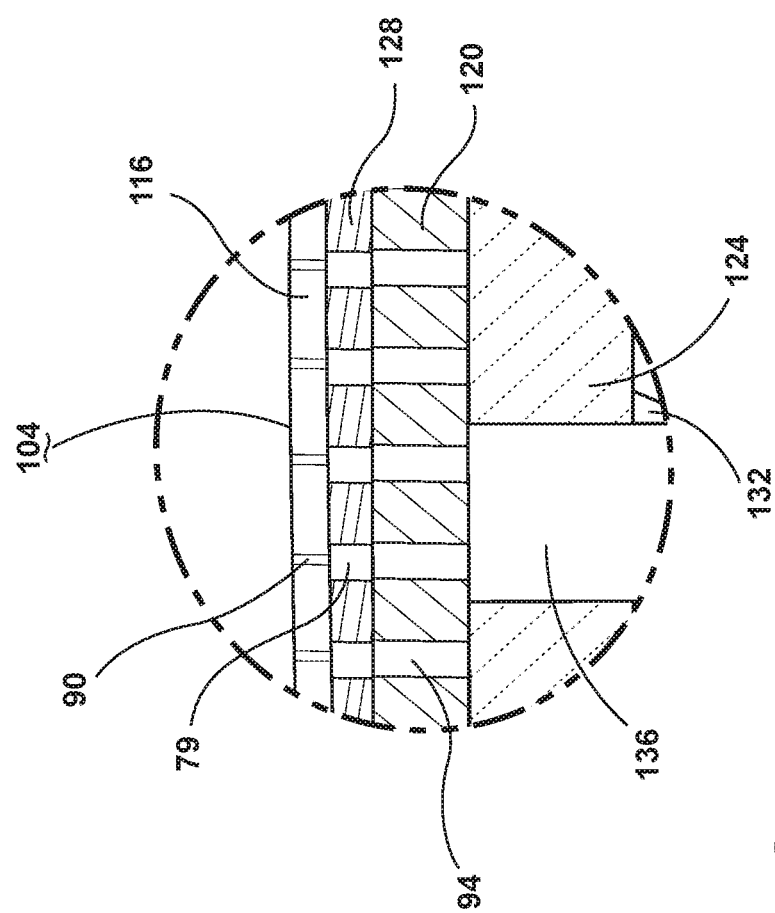

TEMPERATURE CONTROL SYSTEM FOR SEATING ASSEMBLY

FIELD OF THE DISCLOSURE

The present disclosure generally relates to a vehicle seating assembly, and more particularly to a temperature control system for a vehicle seating assembly.

BACKGROUND OF THE DISCLOSURE

Vehicle seat comfort has become increasingly important as passengers take longer trips. Providing heating and cooling in the seating assembly can increase the comfort of passengers.

A variety of vehicle seating assemblies that provide for heating and cooling of an occupant are known. However, current solutions for providing heating and cooling utilize a significant amount of seat space. It is desirable to provide a vehicle seating assembly that efficiently utilizes space within the seat to incorporate heating and cooling elements.

SUMMARY OF THE DISCLOSURE

According to a first aspect of the present disclosure, a vehicle seating assembly includes a cushion and a trim layer. A permeable heater is disposed between the cushion and the trim layer. An air mover is in fluid communication with the permeable heater. The permeable heater and the air mover are operable to respectively heat or cool a seating surface.

Embodiments of the first aspect of the disclosure can include any one or a combination of the following features:
- a spacer pad disposed between the permeable heater and the cushion;
- the permeable heater includes carbon nanotubes encased in a laminate structure;
- the laminate structure includes a central portion and a border portion;
- a laminate structure including a central portion and a border portion, wherein the permeable heater is disposed in the central portion;
- the border portion includes attachment areas for securing the laminate structure to the trim layer;
- a conduit coupled to the air mover and extending through the permeable heater and the cushion;
- the conduit is one of a plurality of conduits extending through the permeable heater and the cushion;
- the permeable heater includes a plurality of temperature control zones;
- the permeable heater includes a plurality of heaters that correspond to the plurality of temperature control zones; and
- the trim layer includes perforations.

According to a second aspect of the present disclosure, a vehicle seating assembly includes a seating surface. An air mover is in fluid communication with the seating surface. A heater is disposed adjacent the seating surface and is operable to direct heat toward the seating surface. A controller is in communication with the heater and the air mover and is configured to receive an input and activate one or more of the heater and the air mover in response to the input.

Embodiments of the second aspect of the disclosure can include any one or a combination of the following features:
- the controller selectively activates the air mover to pull air away from or direct air to the seating surface in response to a cooling indication; and
- the controller selectively activates the heater to direct heat toward the seating surface in response to a heating indication.

According to a third aspect of the present disclosure, a seating assembly includes a permeable heating substrate disposed at a seating surface. An air mover is in fluid communication with the permeable heating substrate. The permeable heating substrate is operable to direct heat toward a seating surface. The air mover is operable to pull air from the seating surface and through the permeable heating substrate.

Embodiments of the third aspect of the disclosure can include any one or a combination of the following features:
- the permeable heating substrate includes a laminate structure including a heater;
- the heater includes at least one of: carbon nanotubes, graphene nanotubes, silicone, or mica;
- a seating surface disposed between the permeable heating substrate and the air mover, wherein the air mover is selectively operable to pull air from the seating surface, through the permeable heating substrate, and into the air mover;
- the seating assembly is a vehicle seating assembly; and
- the seating surface comprises one or more of a seatback seating surface or a seat seating surface.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 4 is a cutaway view of a seat with a layer assembly, according to an embodiment;

FIG. 4A is an exploded view of a section of the seat of FIG. 4 with a positioning member, according to an embodiment;

DETAILED DESCRIPTION OF THE PREFERRED EMBODIMENTS

Figure 1:
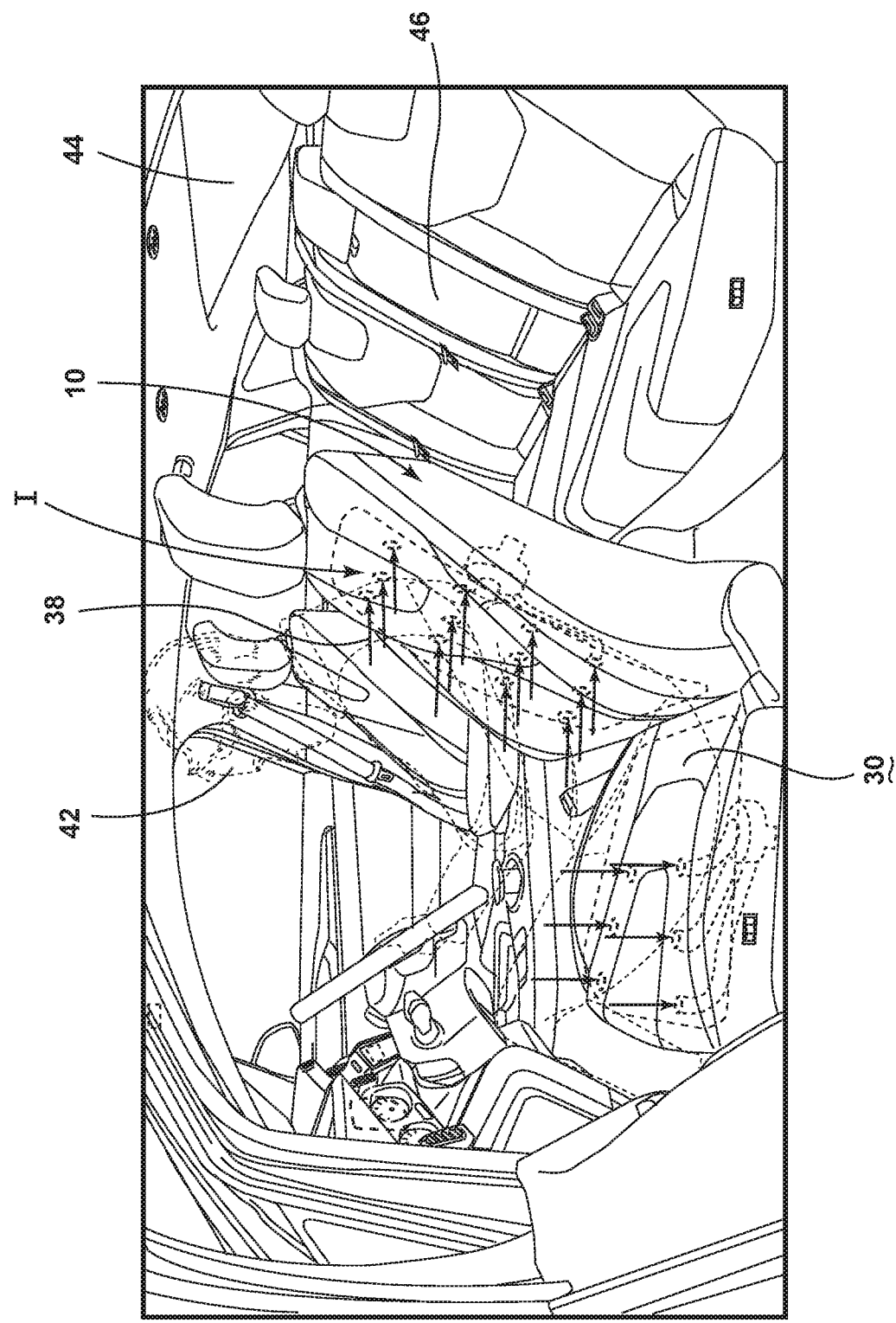
FIG. 1 is a side perspective view of a vehicle cabin with a seating assembly with a cooling mode activated with air being pulled away from a seating surface and into a seating assembly, according to an embodiment.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIGS. 1-17, a vehicle seating assembly 10 includes a cushion 14, a trim layer 18, a heater 22, and an air mover 26. The heater 22 is disposed between the cushion 14 and the trim layer 18. The air mover 26 is in fluid communication with the heater 22. The heater 22 and the air mover 26 are operable to respectively cool or heat a seating surface 30. The heater 22 is permeable.

Referring to FIG. 1, a seating assembly 10 in a cooling mode I is shown. Arrows 38 show air entering the seating assembly 10 at the seating surface 30 and cooling the occupant 42. The seating assembly 10 is shown in a vehicle cabin 44. A bench seat 46 is shown disposed behind the seating assembly 10.

Figure 2:
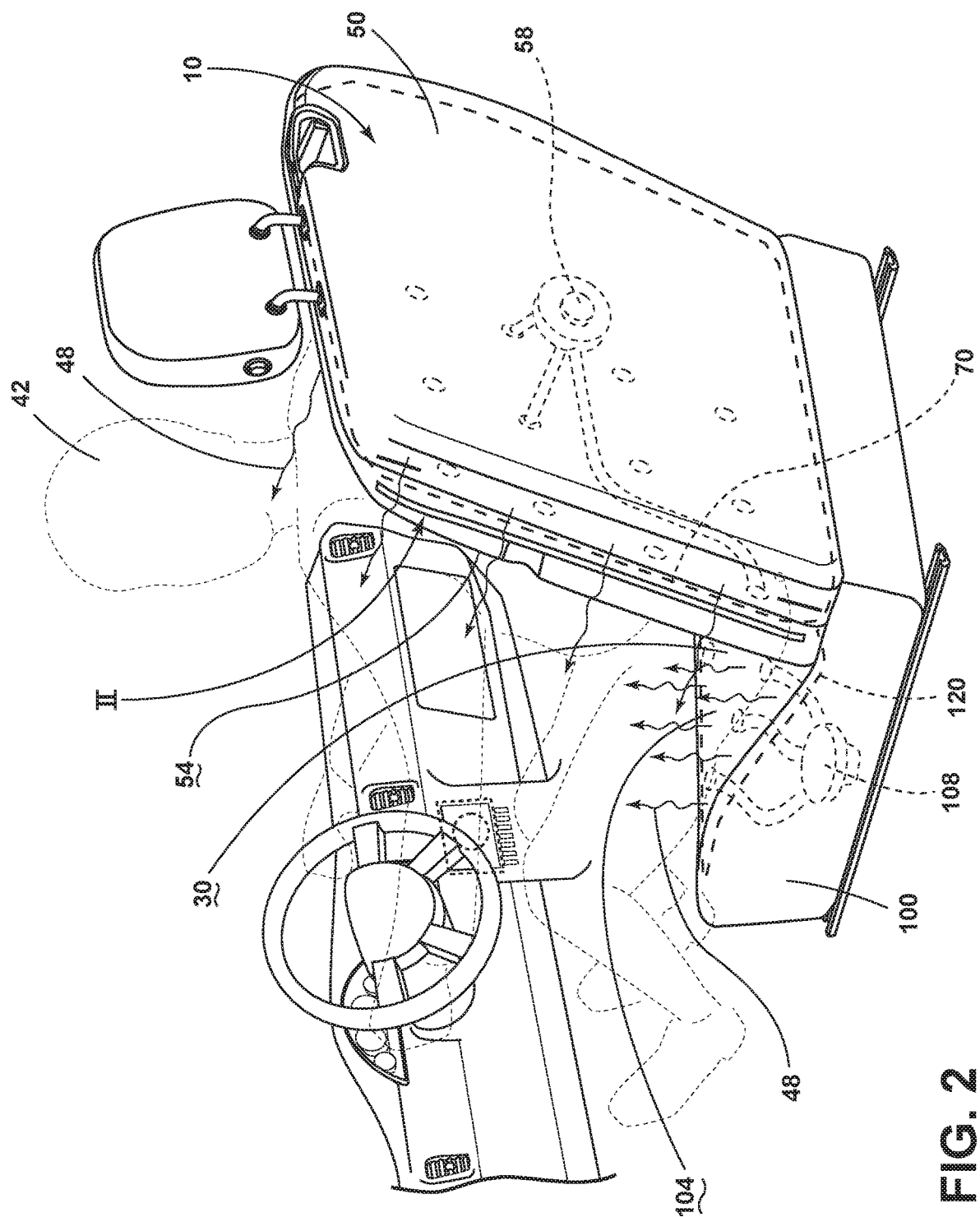
FIG. 2 is a side perspective view of a vehicle cabin with a seating assembly with a heating mode activated, according to an embodiment.

Referring to FIG. 2, a seating assembly 10 in the heating mode II is shown. Arrows 48 show heat leaving the seating surface 30 and heating the occupant 42. The seating assembly 10 may include a seatback 50 and a seat 100.

Figure 3:
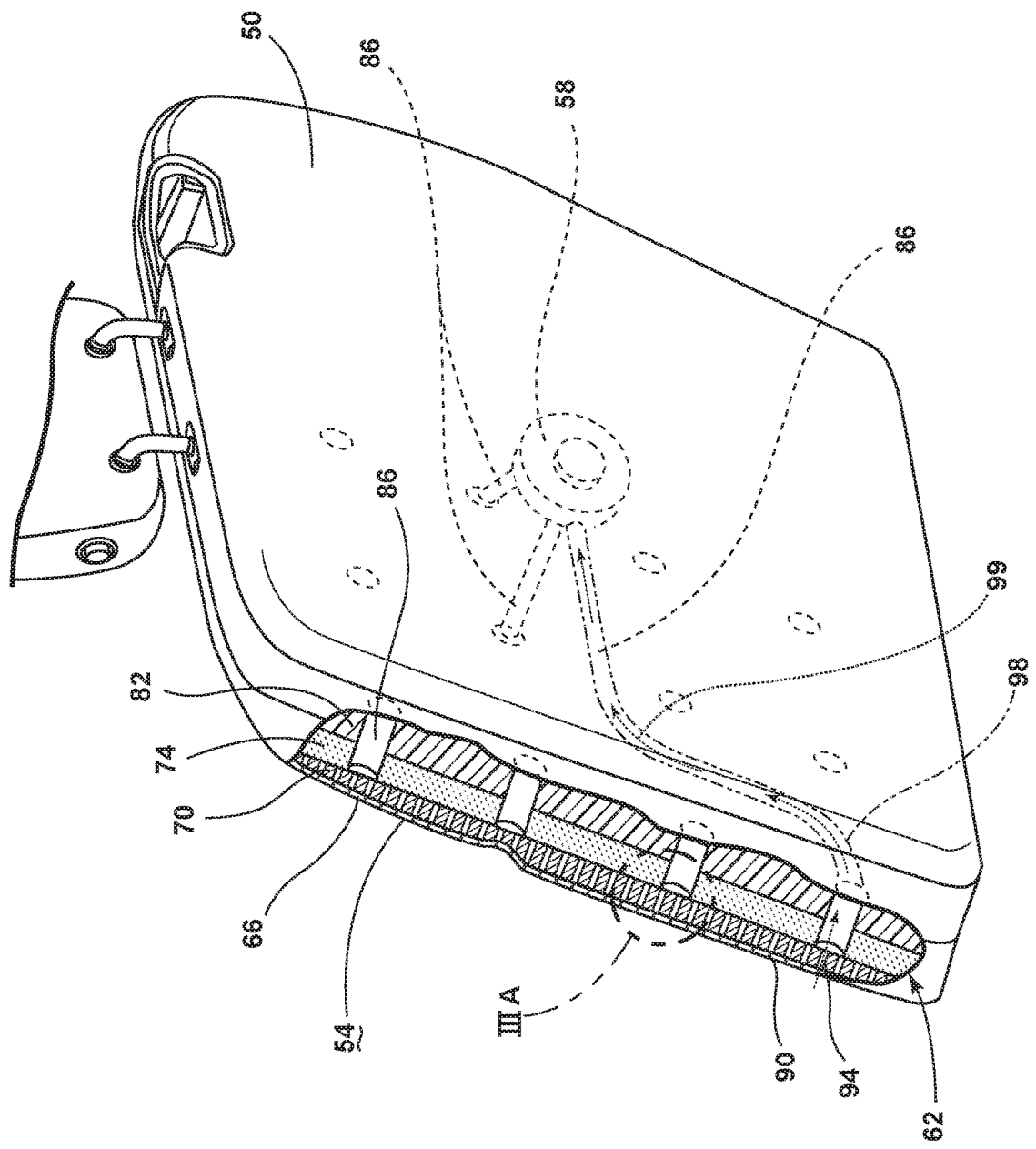
FIG. 3 is a cutaway view of a seatback with a layer assembly, according to an embodiment.

With reference to FIGS. 2 and 3, the seatback 50 may include a seatback seating surface 54. The seatback 50 may also include a seatback air mover 58. The seatback 50 may include a seatback layer assembly 62. The seatback layer assembly 62 may include a seatback trim layer 66, a seatback heater 70, and a seatback spacer pad 74. The seatback layer assembly 62 may be disposed on a seatback cushion 82. Seatback air passageways 86 may extend through the seatback spacer pad 74 and the seatback cushion 82. The seatback trim layer 66 may include perforations 90. The seatback heater 70 may include perforations 94. A seatback conduit 98 may deliver air from the seatback seating surface 54 to the seatback air mover. The seatback conduit 98 may extend through the perforations 90 in the seatback trim layer 66, the perforations 94 in the seatback heater 70, and one or more seatback air passageways 86. Arrows 99 show a flow of air through the seatback conduit 98. As such, the seatback air mover 58 may be activated to cool the seatback seating surface 54 in the cooling mode I (FIG. 1), and the seatback heater 70 may be activated to heat the seatback seating surface 54 in the heating mode II (FIG. 2).

Figure 3A:
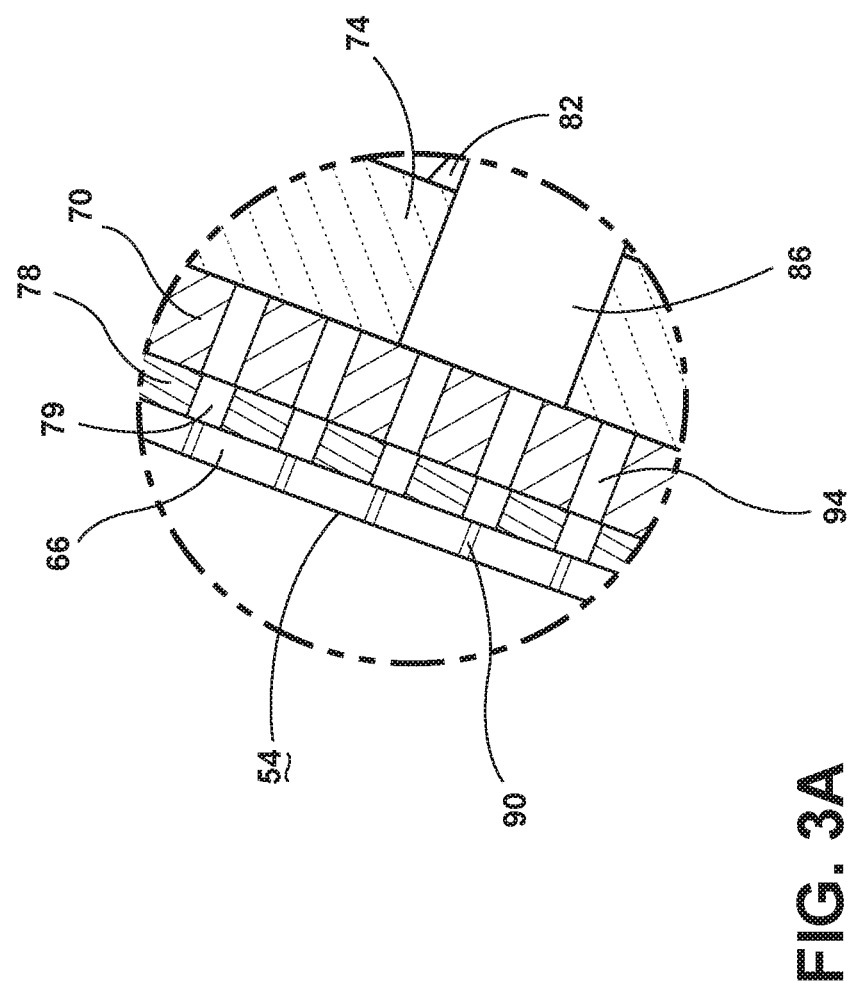
FIG. 3A is an exploded view of a section of the seatback of FIG. 3 with a positioning member, according to an embodiment.

With reference to FIG. 3A, in various embodiments, the seatback layer assembly 62 may also include a seatback positioning member 78 disposed between the seatback trim layer 66 and the seatback heater 70. The seatback positioning member 78 may include perforations 79. The seatback positioning member 78 may maintain alignment of the perforations 90 in the seatback trim layer 66, the perforations 79 in the seatback positioning member 78, and the perforations 94 in the seatback heater 70. Alignment of the perforations 90 in the seatback trim layer 66, the perforations 79 in the seatback positioning member 78, and the perforations 94 in the seatback heater 70 may enable efficient air flow through the seatback trim layer 66, the seatback positioning member 78, and the seatback heater 70.

With reference to FIGS. 2 and 4, the seat 100 may include a seat seating surface 104. The seat 100 may also include a seat air mover 108. The seat 100 may include a seat layer assembly 112. The seat layer assembly 112 may include a seat trim layer 116, a seat heater 120, and a seat spacer pad 124. The seat layer assembly 112 may be disposed on a seat cushion 132. Seat air passageways 136 may extend through the seat spacer pad 124 and the seat cushion 132. The seat trim layer 116 may include perforations 90. The seat heater 120 may include perforations 94. A seat conduit 148 for delivering air from the seat seating surface 104 to the seat air mover 108 may extend through the perforations 90 in the seat trim layer 116, the perforations 94 in the seat heater 120, and one or more seat air passageways 136. Arrows 149 show a flow of air through the seat conduit 148. As such, the seat air mover 108 may be activated to cool the seat 100 in the cooling mode I (FIG. 1), and the seat heater 120 may be activated to heat the seat seating surface 104 in the heating mode II (FIG. 2).

With reference to FIG. 4A, in various embodiments, the seat layer assembly 112 may also include a seat positioning member 128 disposed between the seat trim layer 116 and the seat heater 120. The seat positioning member 128 may include perforations 79. The seat positioning member 128 may maintain alignment of the perforations 90 in the seat trim layer 116, perforations 79 in the seat positioning member 128, and perforations 94 in the seat heater 120. Alignment of the perforations 90 in the seat trim layer 116, the perforations 79 in the seatback positioning member 78, and the perforations 94 in the seat heater 120 may enable efficient airflow through the perforations 90, 79, and 94 in the respective seat trim layer 116, the seat positioning member 128, and the seat heater 120.

With reference to FIGS. 2-4, the proximity of the seatback heater 70 and the seat heater 120 to the occupant 42 may enable generally efficient heat conduction from the seatback heater 70 and the seat heater 120 to the occupant 42. Also, the proximity of the seatback heater 70 and the seat heater 120 to the occupant 42 may enable generally uniform heat distribution across the respective seatback seating surface 54 and the seat seating surface 104. The seatback trim layer 66 and the seat trim layer 116 may be able to conductively transfer heat from the seatback heater 70 and the seat heater 120 to the occupant 42. In one example, the seatback heater 70 and the seat heater 120 may be activated to heat the occupant 42 to a desired temperature within the period of approximately one to four minutes, and ideally approximately two minutes. The seatback heater 70 and the seat heater 120 may reach temperatures within a range from approximately 40° C. to approximately 60° C. to deliver a desired temperature within a range from approximately 35° C. to approximately 43° C. to the seatback seating surface 54 and the seat heating surface 104, respectively. In various embodiments, the seatback heater 70 and the seat heater 120 may include various heating technologies, which may include carbon nanotubes 204, graphene, Kapton (polyimide), a silicon heater, or a mica heater. Also, other heating technologies may be incorporated in the seatback heater 70 and the seat heater 120. The seatback heater 70 and the seat heater 120 may be flexible.

With reference to FIGS. 3-4, in various aspects, the seatback trim layer 66 and the seat trim layer 116 may be sewn, adhesively adhered, or otherwise attached to the respective seatback heater 70 and the seat heater 120. The seatback heater 70 and the seat heater 120 may be sewn to the respective seatback spacer pad 74 and the seat spacer pad 124. In one example, the seatback heater 70 may be a heater mat (with electrical connections attached) that may be positioned between the seatback trim layer 66 and the seatback spacer pad 74. Similarly, in one example, the seat heater 120 may be a heater mat (with electrical connections attached) that may be positioned between the seat trim layer 116 and the seat spacer pad 124. In various examples, the seatback trim layer 66 and the seat trim layer 116 may be vinyl, cloth, leather, a combination of materials, or another material. The seatback spacer pad 74 and the seat spacer pad 124 may provide softness or cushioning to the respective seatback seating surface 54 and the seat seating surface 104. In one example, the seatback spacer pad 74 and the seat spacer pad 124 may be made of foam with a thickness within the range of approximately 1.5 mm to approximately 12.0 mm. In another example, the seatback spacer pad 74 and the seat spacer pad 124 may have a thickness within a range from approximately 3.0 mm to approximately 20.0 mm. The seatback layer assembly 62 and the seat layer assembly 112 may allow airflow through the respective seatback conduit 98 and the seat conduit 148 even when the weight of an occupant 42 compresses the respective seatback layer assembly 62 and the seat layer assembly 112.

With further reference to FIGS. 3-4, perforations 94 in the seatback heater 70 may be aligned with perforations 90 in the seatback trim layer 66. Similarly, perforations 94 in the seat heater 120 may be aligned with perforations 90 in the seat trim layer 116. The seatback trim layer 66 and the seatback heater 70 may be perforated at the same point in the manufacturing process so that the perforations 90 in the seatback trim layer 66 are aligned with the perforations 94 in the seatback trim layer 66. Similarly, the seat trim layer 116 and the seat heater 120 may be perforated in the same point in the manufacturing process so that perforations 90 in the seat trim layer 116 may be aligned with perforations 94 in the seat heater 120.

Referring again to FIG. 3A, a seatback positioning layer 78 within a range from approximately 0.5 to approximately 12 mm, and ideally within a range from approximately 1.0 mm to approximately 6.0 mm may be inserted between the seatback heater 70 and the seatback trim layer 66. The seatback trim layer 66, the seatback positioning layer 78, the seatback heater 70, and the seatback spacer pad 74 may be perforated at the same time in the manufacturing process so that perforations in the seatback trim layer 66, the seatback positioning layer 78, the seatback heater 70, and the seatback spacer pad 74 may be aligned with each other.

Referring again to FIG. 4A, a seat positioning layer 128 of approximately 0.5 to approximately 12 mm, and ideally approximately 1.0 mm to approximately 6.0 mm may be inserted between the seat heater 120 and the seat trim layer 116. The seat trim layer 116, the seat positioning layer 128, the seat heater 120, and the seat spacer pad 124 may be perforated at the same time in the manufacturing process so that perforations in the seat trim layer 116, the seat positioning layer 128, the seat heater 120, and the seat spacer pad 124 may be aligned with each other.

With continued reference to FIGS. 3-4, the seatback heater 70 and the seat heater 120 may have positive and negative terminals for attaching the seatback heater 70 and the seat heater 120 to a power source. In one example, an electrical attachment may include copper bus bars or other conductive metals that may be secured firmly to a carbon nanotube heater. A bus bar may be attached to the carbon nanotube heater using a conductive adhesive. A bus bar may be electrically connected via solder, crimp, or other method to a wire harness, thus connecting the carbon nanotube heater, a power supply, and controls. It is envisioned that there may also be other methods for electrical connection of the carbon nanotube heater to a power source, such as copper pads or copper braided wire bonded to the heater.

With reference to FIGS. 3-4, in various aspects, a seatback heater 70 or a seat heater 120 may be integrated into a seatback trim layer 66, a seat trim layer 116, or other seating surface material directly, such as by a long slit being cut and the seatback heater 70 or the seat heater 120 being inserted into the seatback seating surface 54 and the seat seating surface 104, respectively. Alternatively, the seatback trim layer 66 or the seat trim layer 116 may be cut into sections and attached (either sewing or adhering) to the seatback heater 70 or the seat heater 120. In various embodiments, the seatback spacer pad 74 and the seat spacer pad 124 adjacent to the respective seatback heater 70 and seat heater 120 may act as an insulator and may improve conduction of heat toward the occupant 42.

Figure 5:
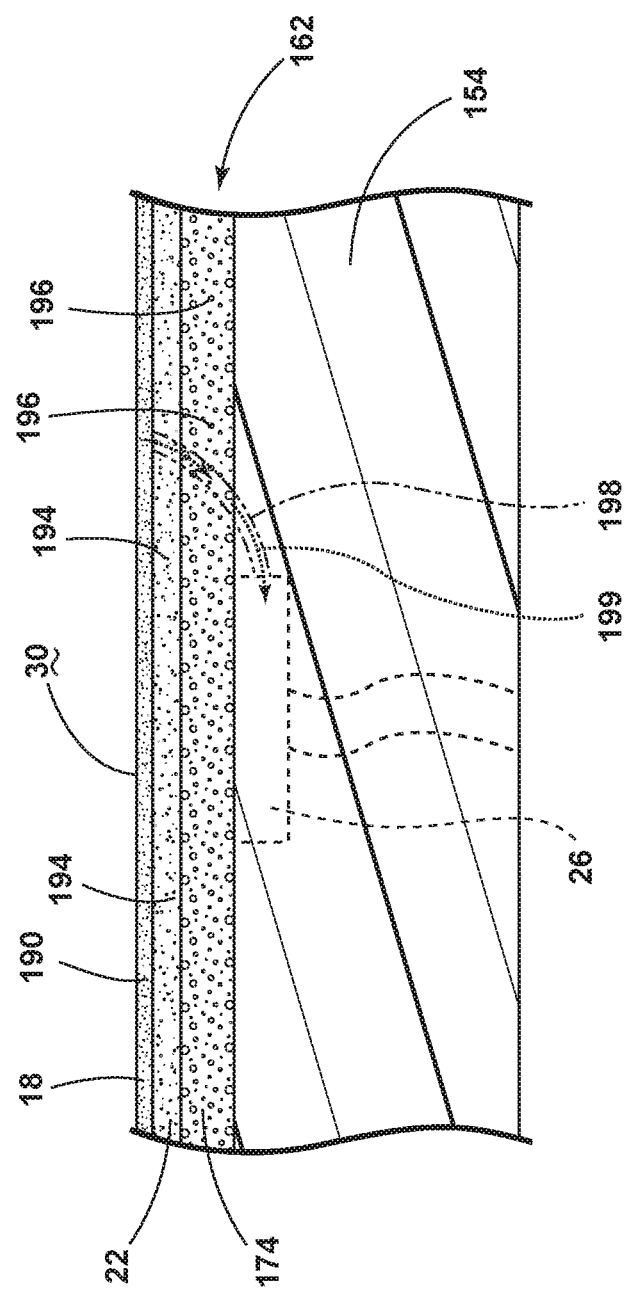
FIG. 5 is a schematic view of a layer assembly and a seating structure, according to an embodiment.

Referring now to FIG. 5, an example of a layer assembly 162 according to another embodiment is shown. In the embodiment shown, a trim layer 18 may include pores 190. The heater 22 may be permeable, and the heater 22 may include pores 194. Similarly, the spacer layer 174 may include pores 196. A seating structure 154 may be disposed adjacent to the spacer layer 174. The seating structure 154 may include a cushion or another seating structure including plastic, a mesh material, a metal, or a sling-type surface. An air mover 26 is shown disposed between seating structure 154 and the spacer layer 174. A conduit 198 may carry air from the seating surface 30 to the air mover 26. Arrows 199 show a flow of air through the conduit 198.

Figure 6:
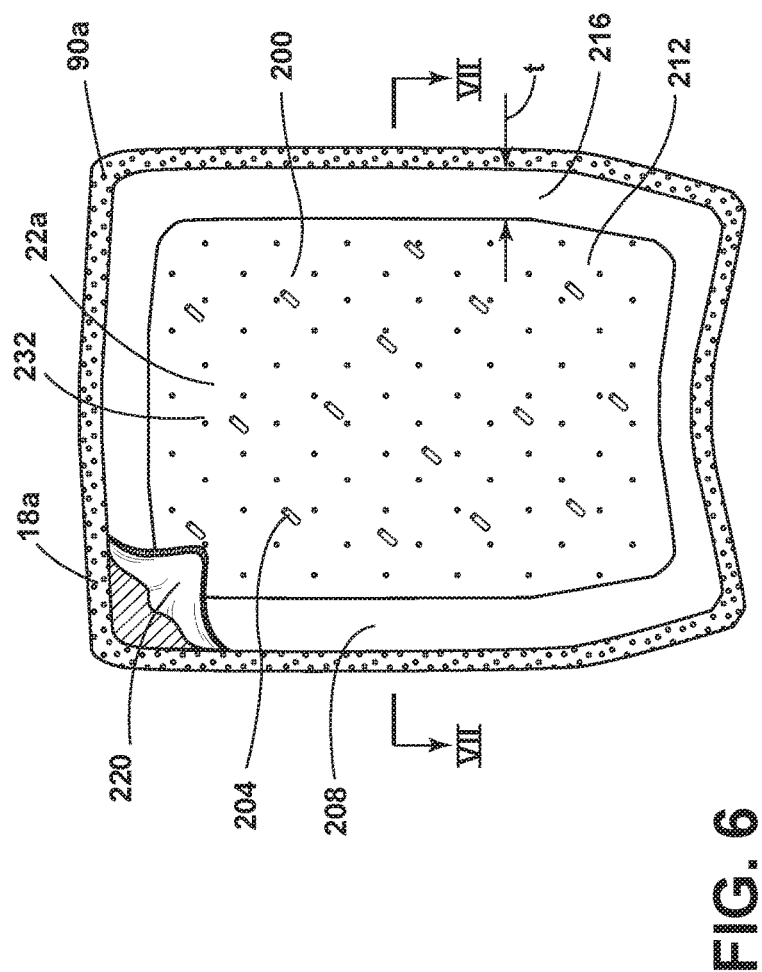
FIG. 6 is a bottom elevational view of a trim layer and a laminate structure including a heater with a carbon nanotube material, according to an embodiment.

Referring now to FIG. 6, an example of a heater 22a and a trim layer 18a are shown. In the example shown, the heater 22a includes a carbon nanotube material 200 and electrical terminals associated with the carbon nanotube material 200. The carbon nanotube material 200 may include carbon nanotubes 204. The heater 22a may be encased in a laminate structure 208. The laminate structure 208 may include a central portion 212 and a border portion 216. The heater 22*a* may be disposed in the central portion 212 of the laminate structure 208. The border portion 216 of the laminate structure 208 may include attachment areas 220 for securing the laminate structure 208 to the trim layer 18*a*. In various embodiments, the border portion 216 may provide an attachment of the heater 22*a* to an electrical connection. In various embodiments, a laminate structure 208 may be attached to the trim layer 18*a* potentially anywhere on the structure, e.g., on the border portion 216 or the central portion 212. The trim layer 18*a* may include perforations 90*a*. The laminate structure 208 (including the heater 22*a*) may include perforations 232. The heater 22*a* may be encased in a laminate structure 208 to provide durability to the carbon nanotube material 200. The location of the carbon nanotube material 200 in the laminate structure 208 helps to prevent wear, corrosion, and/or short circuiting of the carbon nanotube material 200 due to liquid spillage or another reason. The laminate structure 208 may also make up the body or substrate of the carbon nanotube material 200. In various embodiments, the laminate structure 208 may be less than approximately 3.0 mm thick and ideally less than approximately 1.0 mm thick. The laminate structure 208 may include a nylon based plastic laminate, PTFE (polytetrafluoroethylene), or other durable plastics. The laminate structure 208 may be durable. As such, the laminate structure 208 may be substantially tear and rip resistant. The laminate structure 208 may be soft and may have a good drape so that it may not rub against itself and make crinkly noise. The laminate structure 208 may cover all of the carbon nanotube material 200, or the laminate structure 208 may cover the electrical areas of the carbon nanotube material 200, such as bus bars, to protect circuitry in the heater 22*a*. A border portion 216 may define a perimeter around the central portion 212. The thickness t of the perimeter may be within a range of approximately 0.25 inches to approximately 1.0 inches and ideally approximately 0.5 inches. The laminate structure 208 and the heater 22*a* may be an example of a permeable heating substrate. In various embodiments, a heater 22*a* may be integrated directly into a spacer pad 74, 124 (FIGS. 3 and 4). That is, in various embodiments, the laminate structure 208 may be made of spacer pad material.

Figure 7:
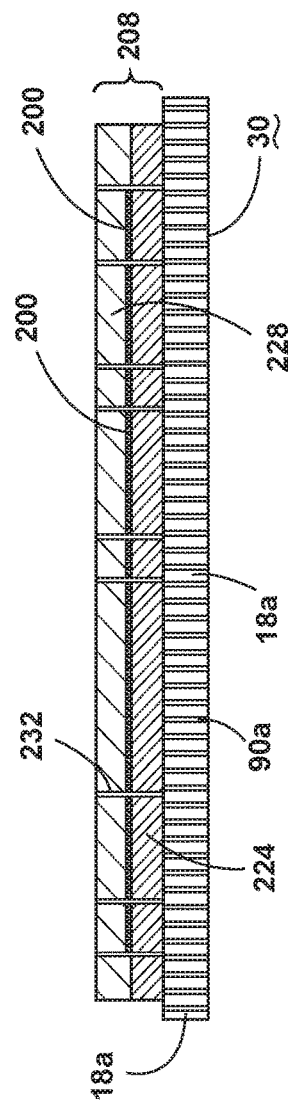
FIG. 7 is a cross-sectional view taken along line VII-VII of FIG. 6, according to an embodiment.

With reference to FIG. 7, a cross-sectional view of the trim layer 18*a* and laminate structure 208 of FIG. 6 is shown. The laminate structure 208 may include a carbon nanotube material 200 disposed between a first portion 224 of the laminate structure 208 and a second portion 228 of the laminate structure 208. Perforations 232 may extend through the laminate structure 208 and the carbon nanotube material 200. Perforations 90*a* may also extend through the trim layer 18*a*. The perforations 90*a* and 232 enable the flow of air from a seating surface 30 to an air mover 26 (not shown) for cooling the seating surface 30. The first portion 224 and the second portion 228 may include different materials having different conductivities. As such, the second portion 228 may be more insulating than the first portion 224.

With continued reference to FIGS. 6-7, in one embodiment, the second portion 228 of the laminate structure 208 may be a thick plastic foam-like material that may provide durability and comfort to an occupant 42 (not shown). The thick, plastic foam-like material may act as a spacer pad. In various embodiments, a trim layer may define the first portion 224 of the laminate structure 208 of the heater 22*a*. There may be exposed areas of electrical connection on the backside of the heater 22*a*.

Figure 8:
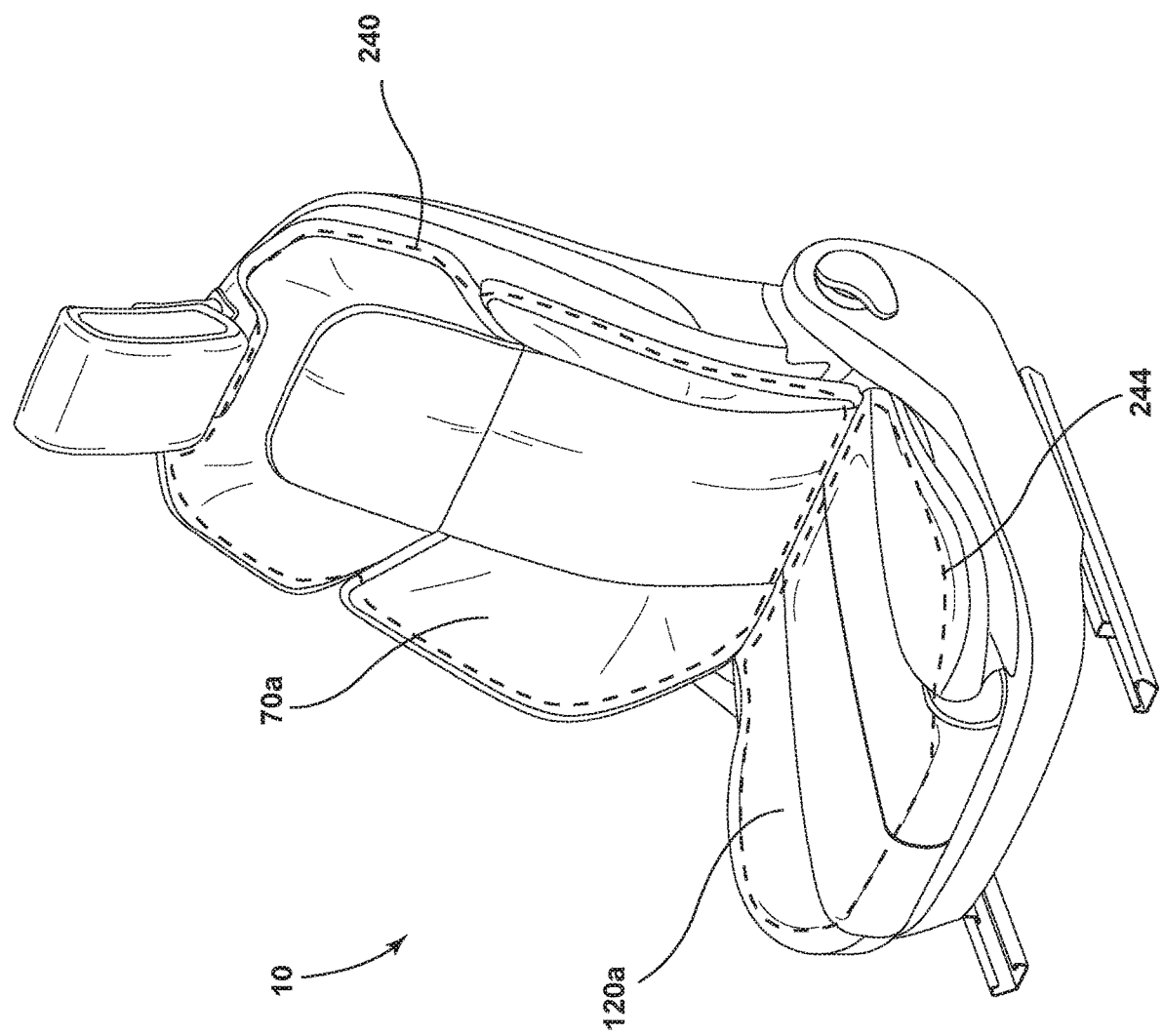
FIG. 8 is a perspective view of a seating assembly showing a single seatback temperature control zone and a seat temperature control zone, according to an embodiment.
Figure 9:
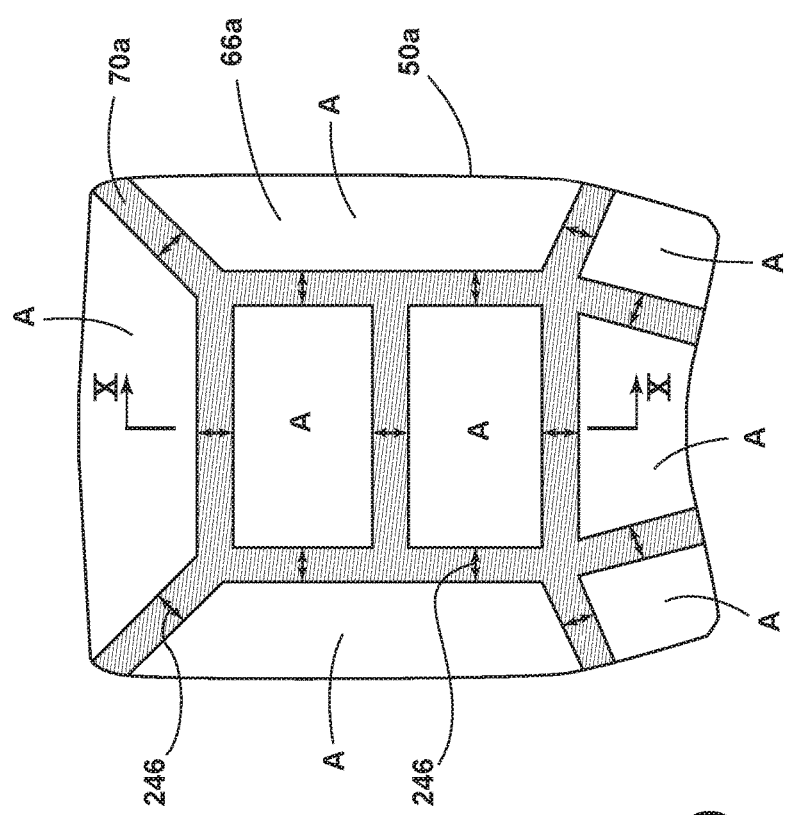
FIG. 9 is a schematic view of a seatback with a single seatback temperature control zone, according to an embodiment.
Figure 10:
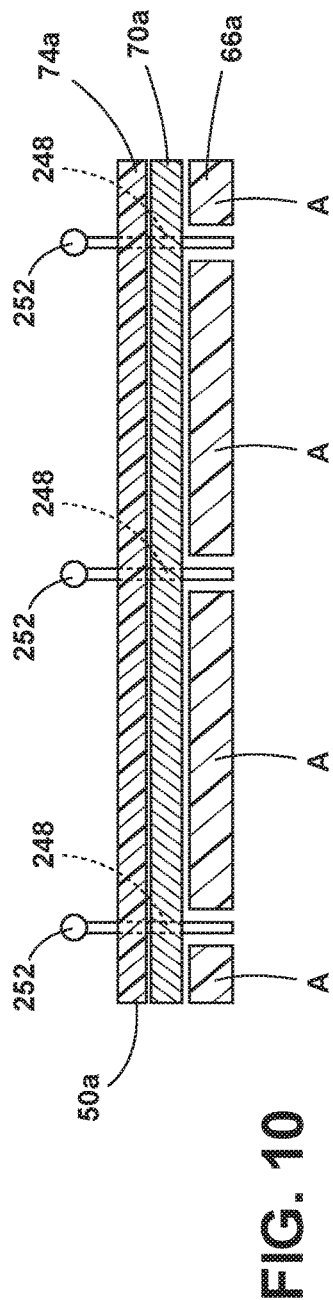
FIG. 10 is a cross-sectional view taken along line X-X of FIG. 9, according to an embodiment.

Referring now to FIGS. 8-10, a seating assembly 10 with a seatback temperature control zone 240 and a seat temperature control zone 244 is shown. With reference to FIG. 8, the seatback 50 may be heated in the seatback temperature control zone 240 by a monolithic seatback heater 70*a*, and the seat 100 may be heated in the seat temperature control zone 244 by a monolithic seat heater 120*a*. Referring to FIG. 9, the seatback trim layer 66*a* may be divided into individual sections A that are sewn or otherwise adhered to a monolithic seatback heater 70*a*, and a seatback spacer pad 74*a*. The arrows 246 disposed between the adjoining sections A indicate that the adjoining sections A may be sewn or otherwise fastened together. With reference to FIG. 10, a cross section of the seatback 50 taken along line X-X of FIG. 9 is shown. The seatback trim layer 66*a* sections A, the seatback heater 70*a*, and the seatback spacer pad 74*a* may be connected by seams 248. The seams 248 may be anchored to wires 252 or other structures extending along the seatback. The construction of the seatback 50 in FIGS. 9-10 may also be used for a seat 100.

Figure 11:
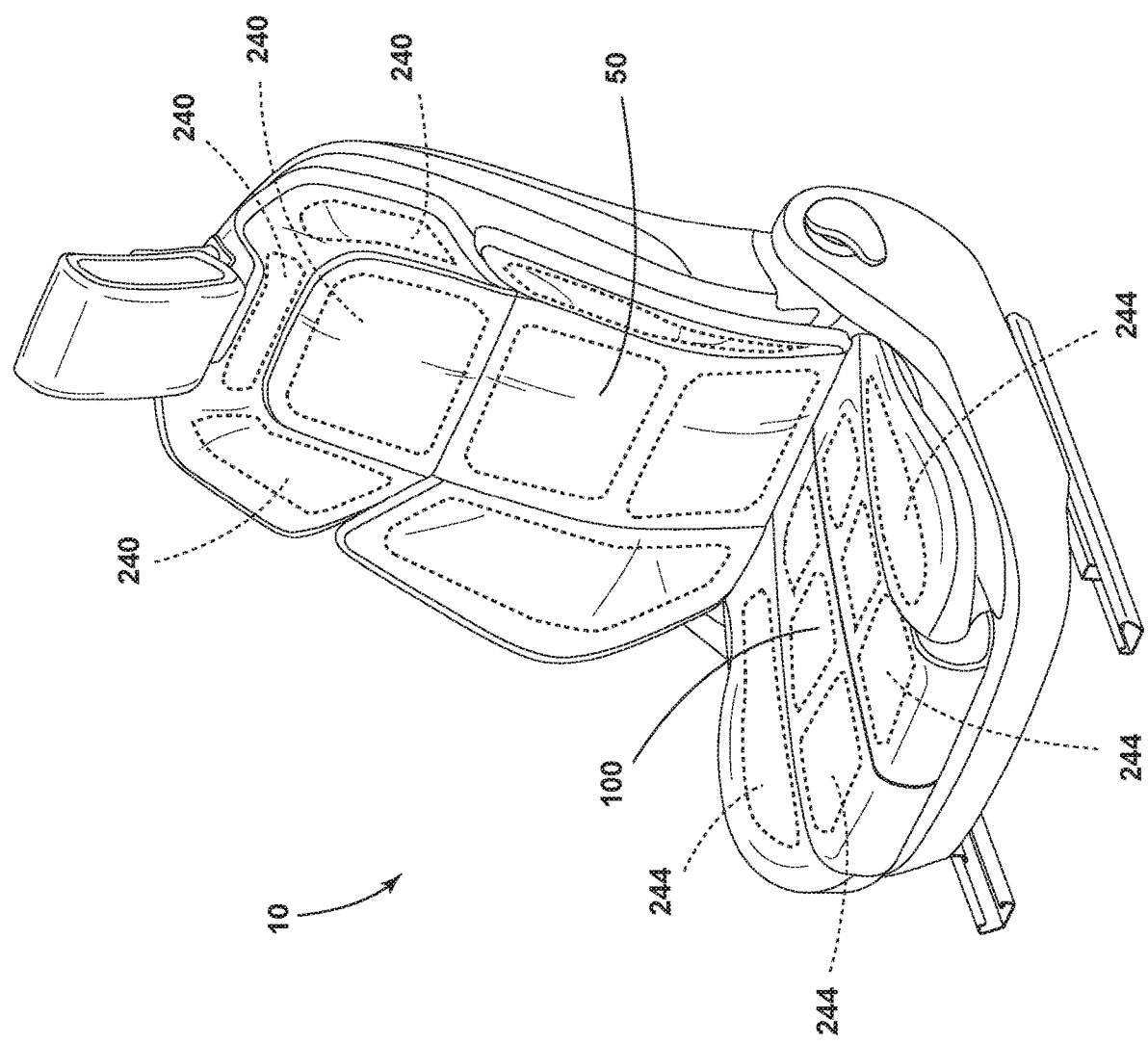
FIG. 11 is a perspective view of a seating assembly showing a plurality of seatback temperature control zone sections and a plurality of seat temperature control sections, according to an embodiment.
Figure 12:
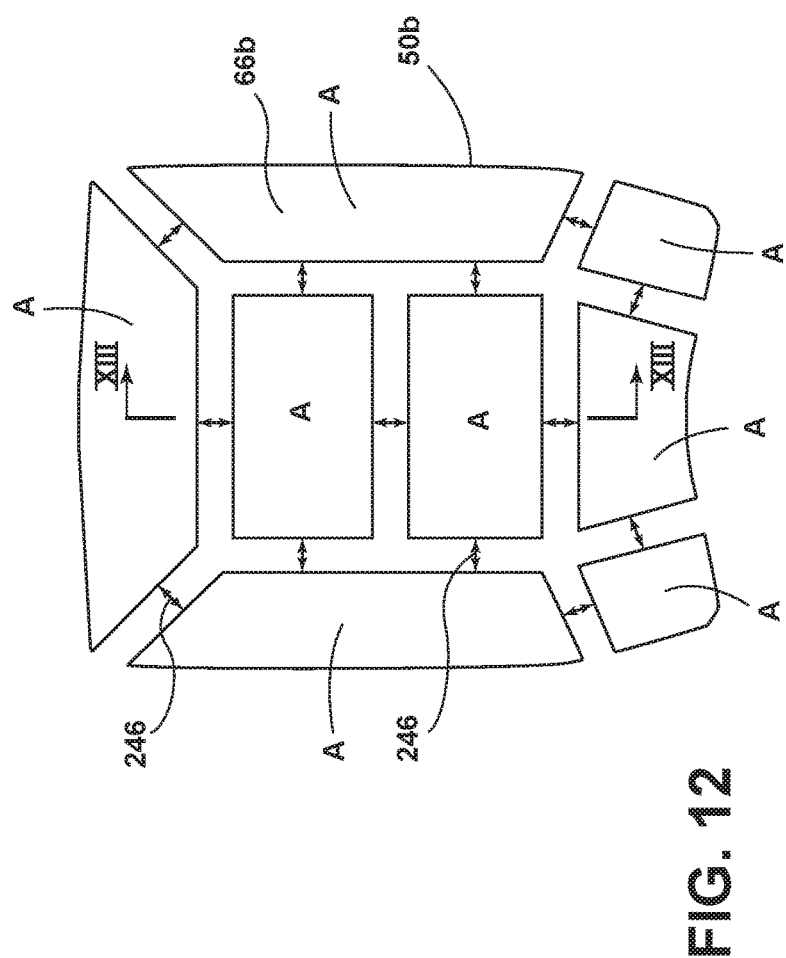
FIG. 12 is a schematic view of a seatback with a plurality of temperature control zones, according to an embodiment.
Figure 13:
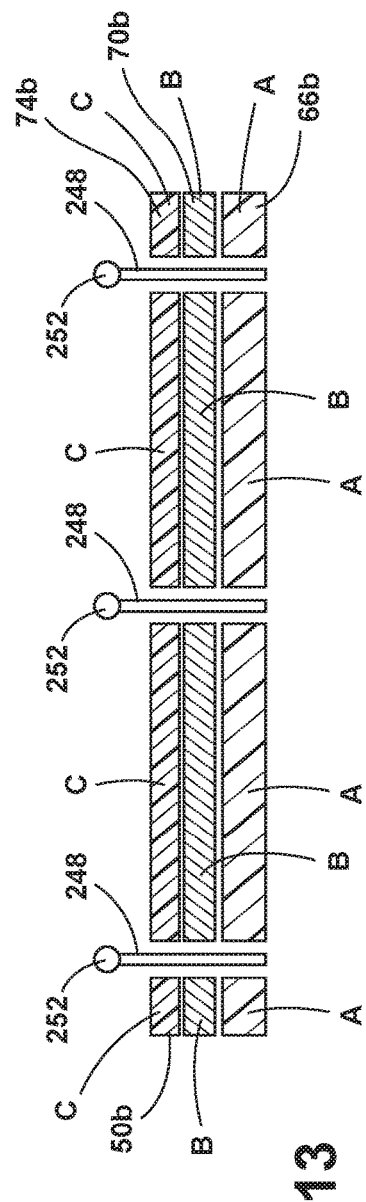
FIG. 13 is a cross-sectional view taken along line XII-XII of FIG. 11, according to an embodiment.

Referring to FIGS. 11-13, a seating assembly 10 with a plurality of seatback temperature control zones 240 and a plurality of seat temperature control zones 244 is shown. With reference to FIG. 11, the temperature of each seatback temperature control zone 240 in the seatback 50 may be individually set. Similarly, the temperature of each seat temperature control zone 244 in the seat 100 may be individually set. The arrows 246 disposed between the sections A indicate the adjoining sections A that may be sewn or otherwise fastened together. Referring to FIG. 13, each seatback temperature zone 240 may include a seatback trim layer 66*b* section A, a seatback heater 70*b* section B, and a seatback spacer pad 74*b* section C. The seatback trim layer 66*b* sections A, the seatback heater 70*b* sections B, and the seatback spacer pad 74*b* sections C may be connected by seams 248. The seams 248 may be anchored to wires 252 or other structures extending along the seatback 50. The construction of a seatback 50 shown in FIGS. 12-13 may also be used for a seat 100.

Figure 14:
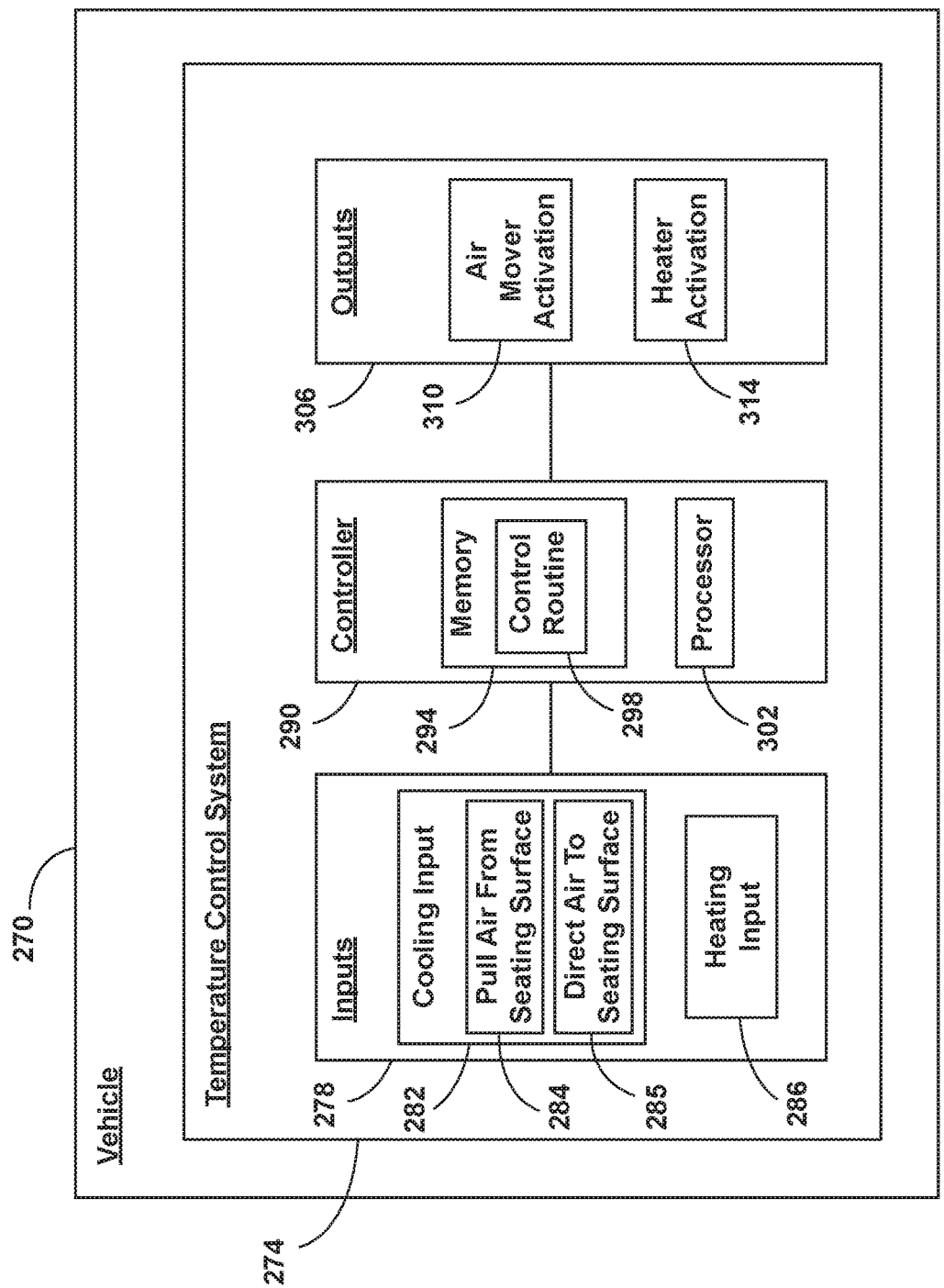
FIG. 14 is a schematic block diagram of a temperature control system, according to an embodiment.

Referring now to FIG. 14, a block diagram of a vehicle 270 is shown including the temperature control system 274. The temperature control system 274 may be selectively activated to enable operation of the seating assembly 10 in at least the cooling mode I (FIG. 1) or the heating mode II (FIG. 2). The temperature control system 274 includes inputs 278 that may include a cooling input 282 and a heating input 286. The cooling input 282 may include a direction 284 to pull air from a seating surface 30. The cooling input 282 may include a direction 285 to direct air to a seating surface 30. In various embodiments, the air directed to the seating surface 30 may be conditioned air or ambient air. Conditioned air may include air conditioned by a vehicle air conditioning or HVAC system. Conditioned air may also include air conditioned by a thermoelectric device. The inputs 278 are in communication with a controller 290. The controller 290 may include a memory 294. The memory 294 may include a control routine 298. The controller 290 may also include a processor 302. Outputs 306 may include air mover activation 310 and heater activation 314. As such, the controller 290 may be in communication with the heater 22 and the air mover 26. The controller 290 may be configured to receive an input 278 and activate one or more of the heater 22 and the air mover 26 in response to the input 278. The controller 290 may selectively activate the air mover 26 to pull air away from the seating surface 30 in response to a cooling indication (i.e., cooling input 282). The controller 290 may selectively activate the heater 22 to direct heat toward the seating surface 30 in response to a heating indication (i.e., heating input 286).

Figure 15B:
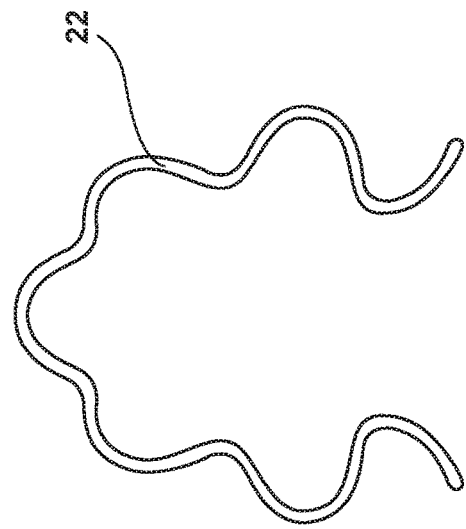
FIG. 15B is an elevational view of a heater having a serpentine shape, according to an embodiment.
Figure 15D:
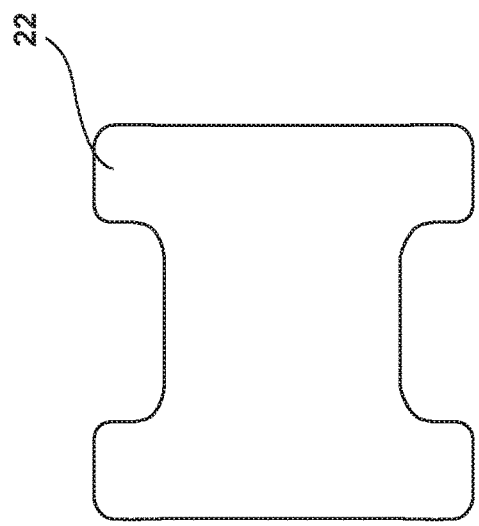
FIG. 15D is an elevational view of a heater having a central portion and bolsters, according to an embodiment.
Figure 15A:
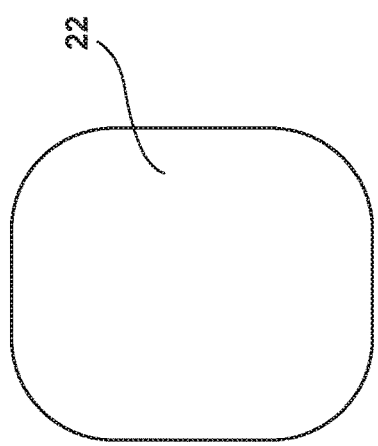
FIG. 15A is an elevational view of a heater having a rectangular shape, according to an embodiment.
Figure 15C:
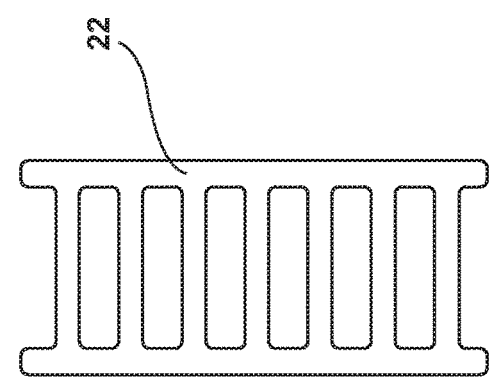
FIG. 15C is an elevational view of a heater having a ladder shape, according to an embodiment.

A heater 22 may have various geometries. The various geometries may include a monolithic sheet having a rectangular shape (FIG. 15A). The heater 22 may also have a snaking serpentine-type shape (FIG. 15B), a ladder-type shape (FIG. 15C), or a shape that includes bolster areas (FIG. 15D). The shape of the heater 22 may be adopted to fit on a seatback 50, a seat 100, or other seating surface 30 (for example, the seat or seatback of the bench seat 46 in FIG. 1). The heater 22 may be cut to create a geometry to match a pattern of trim and foam in a seating assembly 10. In various aspects, multiple carbon nanotube sheets may be connected together to create a heater 22 designed to cover areas of the seat (such as bolsters) that may be hard to access. According to various embodiments of the disclosure, the heaters 22 may run electrically in series or parallel. The heaters 22 may be controlled from existing power controllers in the vehicle 270, through the climate control module, or through the seat module. Heaters 22 may also each be run to designated controllers and controlled individually.

Figure 16:
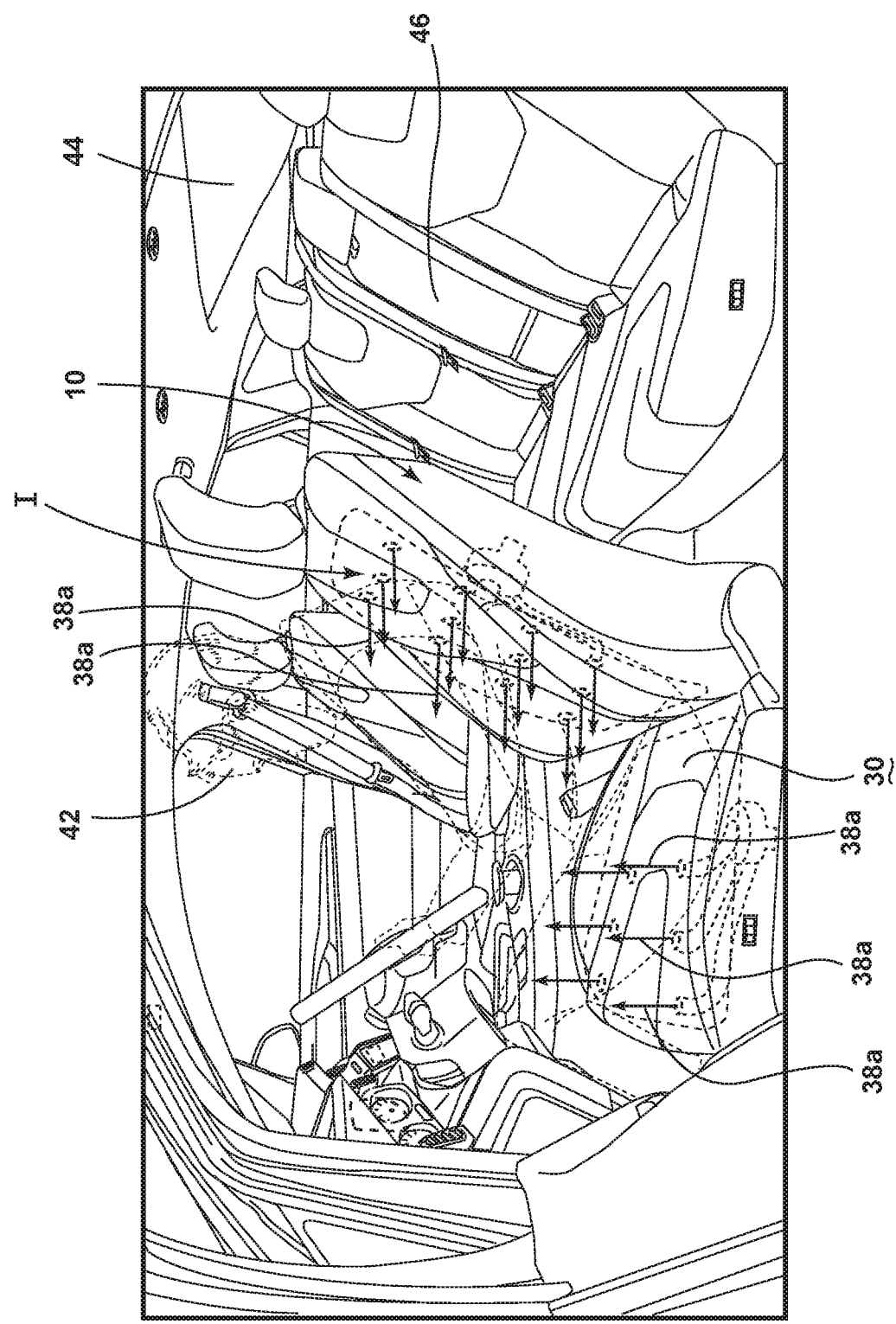
FIG. 16 is a side perspective view of a vehicle cabin with a seating assembly with a cooling mode activated with air being pushed away from a seating surface and out of a seating assembly, according to an embodiment.

With reference to FIG. 16, an embodiment of the seating assembly 10 is shown in a cooling mode I. Arrow 38a shows air leaving the seating assembly 10 at the seating surface 30 and cooling the occupant 42. Air represented by arrows 38a may be directed from the air movers 58, 108 (FIG. 2) to and through the seating surface 30.

Figure 17:
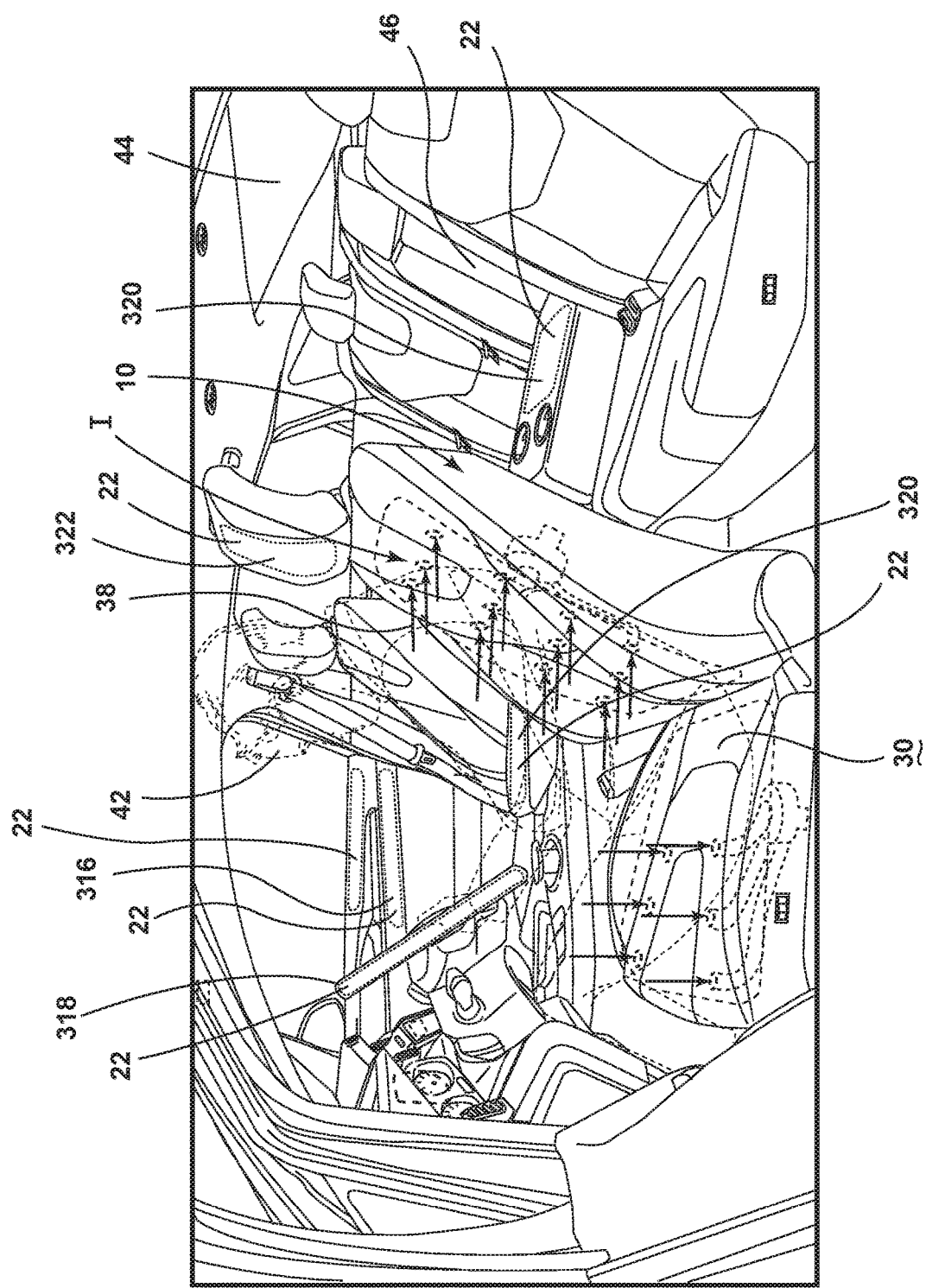
FIG. 17 is a side perspective view of a vehicle cabin with a seating assembly with heaters disposed on the door, the steering wheel, armrests, and a headrest, according to an embodiment.

With reference to FIG. 17, and in various embodiments, a heater 22 may be disposed in various contactable surfaces (e.g., a door 316, a steering wheel 318, an armrest 320, a headrest 322) of a vehicle cabin 44 to heat the occupant 42. The heater 22 may be disposed below a trim or other cover of the door 316, the steering wheel 318, the armrest 320, or the headrest 322. Similarly, a permeable heater 22 in communication with an air mover may be disposed in various contactable surfaces of a vehicle cabin 44 to heat or cool an occupant 42. The permeable heater 22 in communication with an air mover may be disposed below a trim or other cover of the door 316, the steering wheel 318, the armrest 320, or the headrest 322.

With reference to FIGS. 1-17, a seating assembly 10 may include a permeable heating substrate (for example, heater 22 with perforations 94 or pores 194) disposed at a seating surface 30. An air mover 26 may be in fluid communication with the permeable heating substrate. The permeable heating substrate may be operable to direct heat toward a seating surface 30 (FIG. 2, heating mode II), and the air mover 26 may be operable to pull air from the seating surface 30 and through the permeable heating substrate (FIG. 1, cooling mode I).

In various applications, a heating mode of the seating assembly 10 may utilize the heater 22, and a cooling mode of the seating assembly 10 may utilize conductive or radiative cooling.

A variety of advantages may be derived from the disclosure. Proximity of the heater 22 to the seating surface 30 may allow the heat to quickly reach the seating surface 30 and heat an occupant 42.

It is to be understood that variations and modifications can be made on the afore-mentioned structure without departing from the concepts of the present disclosure, and further it is to be understood that such concepts are intended to be covered by the following claims unless these claims by their language expressly state otherwise.

What is claimed is:

1. A vehicle seating assembly comprising:
   a cushion;
   a trim layer;
   a permeable heater including carbon nanotubes disposed between the cushion and the trim layer; and
   an air mover in fluid communication with the permeable heater including carbon nanotubes, wherein the permeable heater including carbon nanotubes and the air mover are operable to respectively heat or cool a seating surface.

2. The vehicle seating assembly of claim 1, further comprising:
   a spacer pad disposed between the permeable heater including carbon nanotubes and the cushion.

3. The vehicle seating assembly of claim 1, further comprising:
   a laminate structure encasing the carbon nanotubes.

4. The vehicle seating assembly of claim 3, wherein the laminate structure includes a central portion and a border portion and wherein the carbon nanotubes are disposed in the central portion.

5. The vehicle seating assembly of claim 1, further comprising:
   a laminate structure including a central portion and a border portion, wherein the permeable heater including carbon nanotubes is disposed in the central portion.

6. The vehicle seating assembly of claim 4, wherein the border portion includes attachment areas for securing the laminate structure to the trim layer and wherein the central portion is thicker than the border portion.

7. The vehicle seating assembly of claim 1, further comprising:
   a conduit coupled to the air mover and extending through the permeable heater including carbon nanotubes and the cushion.

8. The vehicle seating assembly of claim 7, wherein the conduit is one of a plurality of conduits extending through the permeable heater including carbon nanotubes and the cushion.

9. The vehicle seating assembly of claim 1, wherein the permeable heater including carbon nanotubes includes a plurality of temperature control zones.

10. The vehicle seating assembly of claim 9, wherein the permeable heater including carbon nanotubes is disposed between a first and a second portion of a laminate structure.

11. The vehicle seating assembly of claim 10, wherein the first and the second portions of the laminate structure have different thermal conductivities.

12. A vehicle seating assembly comprising:
    a seating surface;
    an air mover in fluid communication with the seating surface;
    an air permeable heater having a carbon nanotube structure and disposed adjacent the seating surface and operable to direct heat toward the seating surface; and
    a controller in communication with the air permeable heater having the carbon nanotube structure and the air mover and configured to receive an input and activate one or more of the air permeable heater having the carbon nanotube structure and the air mover in response to the input.

13. The vehicle seating assembly of claim 12, wherein the controller selectively activates the air mover to pull air away from or direct air to the seating surface and through the air permeable heater having the carbon nanotube structure in response to a cooling indication.

14. The vehicle seating assembly of claim 12, wherein the controller selectively activates the air permeable heater having the carbon nanotube structure to direct heat toward the seating surface in response to a heating indication.

15. A seating assembly comprising:
a permeable heating substrate secured to a trim layer disposed at a seating surface, and
an air mover in fluid communication with the permeable heating substrate secured to the trim layer, wherein the permeable heating substrate secured to the trim layer is operable to direct heat toward a seating surface and wherein the air mover is operable to pull air from the seating surface and through the permeable heating substrate secured to the trim layer to cool the seating surface.

16. The seating assembly of claim 15, wherein the permeable heating substrate secured to the trim layer includes a laminate structure having a first portion, a second portion, and a heater disposed between the first portion and the second portion.

17. The seating assembly of claim 16, wherein the heater includes at least one of: a carbon nanotube, a graphene nanotube, silicone, or mica.

18. The seating assembly of claim 17, wherein the seating assembly is a vehicle seating assembly.

19. The seating assembly of claim 18, wherein the seating surface comprises one or more of a seatback seating surface or a seat seating surface.

20. The seating assembly of claim 16, wherein the first portion and the second portion have different thermal conductivities.

* * * * *